United States Patent
Sathish (10) Patent No.: US 9,380,142 B2
(45) Date of Patent: Jun. 28, 2016

(54) FRAMEWORK FOR USER-CREATED DEVICE APPLICATIONS

(75) Inventor: Sailesh K. Sathish, Tampere (FI)

(73) Assignee: Nokia Technologies Oy, Espoo (FI)

( * ) Notice: Subject to any disclaimer, the term of this patent is extended or adjusted under 35 U.S.C. 154(b) by 864 days.

(21) Appl. No.: 13/268,063

(22) Filed: Oct. 7, 2011

(65) Prior Publication Data

US 2013/0090923 A1 Apr. 11, 2013

(51) Int. Cl.
*H04M 1/64* (2006.01)
*H04M 1/60* (2006.01)
*H04M 1/27* (2006.01)
*H04M 1/2745* (2006.01)
*G10L 15/22* (2006.01)
*H04M 1/725* (2006.01)

(52) U.S. Cl.
CPC ............ *H04M 1/6091* (2013.01); *H04M 1/271* (2013.01); *H04M 1/274508* (2013.01); *G10L 2015/223* (2013.01); *H04M 1/7253* (2013.01); *H04M 2250/02* (2013.01); *H04M 2250/74* (2013.01)

(58) Field of Classification Search
CPC ............ H04M 1/271; H04M 3/4931; H04M 3/42204; H04M 2201/40; G10L 15/30; G10L 15/065; G10L 15/1822; G10L 15/265; H04W 4/02; G06F 17/30905

USPC .......... 704/235, 270, 257, 251, 270.1, 9, 254, 704/252, 278, 260, 275, 246, 231, 228, 10, 704/233, 243, 230; 379/88.14, 75, 88.01; 715/255; 719/328
See application file for complete search history.

(56) References Cited

U.S. PATENT DOCUMENTS

| | | | |
|---|---|---|---|
| 6,690,772 B1 * | 2/2004 | Bechtel et al. | 379/88.03 |
| 6,801,604 B2 * | 10/2004 | Maes et al. | 379/88.17 |
| 6,996,227 B2 * | 2/2006 | Albal et al. | 379/355.05 |
| 7,609,829 B2 * | 10/2009 | Wang et al. | 379/201.01 |
| 8,195,203 B1 * | 6/2012 | Tseng | 455/457 |
| 8,239,206 B1 * | 8/2012 | LeBeau et al. | 704/275 |
| 8,417,233 B2 * | 4/2013 | Woloshyn | 455/418 |
| 8,731,939 B1 * | 5/2014 | Lebeau et al. | 704/275 |
| 2003/0046088 A1 * | 3/2003 | Yuschik | 704/276 |
| 2003/0147518 A1 * | 8/2003 | Albal et al. | 379/207.15 |
| 2003/0179866 A1 * | 9/2003 | Stillman et al. | 379/88.19 |
| 2006/0026281 A1 * | 2/2006 | Hodgson et al. | 709/224 |
| 2007/0061488 A1 * | 3/2007 | Alagappan et al. | 709/246 |
| 2008/0037720 A1 * | 2/2008 | Thomson et al. | 379/88.01 |

\* cited by examiner

*Primary Examiner* — Vijay B Chawan
(74) *Attorney, Agent, or Firm* — Harrington & Smith (57) ABSTRACT

A method to provide an interface for launching applications is described. The method includes receiving information indicative of a record stored in an electronic device application. The method also includes determining whether the record is associated with a software application command. In response to determining that the record is associated with a software application command, the software application command is activated. Apparatus and computer readable media are also described.

19 Claims, 4 Drawing Sheets

FRAMEWORK FOR USER-CREATED DEVICE APPLICATIONS

TECHNICAL FIELD

The exemplary and non-limiting embodiments of this invention relate generally to wireless communication systems, methods, devices and computer programs and, more specifically, relate to initiation of applications/services.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Currently, there is no framework on mobile or other systems that allow users to create their own personalized services through combination of other services and still enabling access to those through new modalities such as the voice dialer in the car. Web based mashup applications may be created by combining one or more web apps into a single web application by piping the input and output of each application together via a script.

Many modern cars come with a name dialer in-built or can be had as an add-on. The name dialer works on the principle that users train the speech recognizer in the car to their voice and then upload their contacts in the contact book. A pairing has to be performed between the car and the phone. Then, when the phone is in the vicinity of the car (and the car is on), the user can dial or accept calls using the car speakers and microphone. The name dialer sends signal to the mobile device about the intended caller present in the phone book. The phone will then dial that particular intended caller and, if the call is accepted, dual audio communication is performed using the car microphone and car speakers through the phone.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method to provide an additional interface for launching applications. The method includes receiving information indicative of a record stored in an electronic device application. The method also includes determining whether the record is associated with a software application command. In response to determining that the record is associated with a software application command, the software application command is activated.

In a further aspect thereof an exemplary embodiment of this invention provides an apparatus to provide an additional interface for launching applications. The apparatus includes at least one processor; and at least one memory including computer program code. The at least one memory and the computer program code are configured to, with the at least one processor, cause the apparatus to perform actions. The actions include to receive information indicative of a record stored in an electronic device application; to determine whether the record is associated with a software application command; and in response to determining that the record is associated with a software application command, to activate the software application command.

In an additional aspect thereof an exemplary embodiment of this invention provides a computer readable medium to provide an additional interface for launching applications. The computer readable medium is tangibly encoded with a computer program executable by a processor to perform actions. The actions include receiving information indicative of a record stored in an electronic device application; determining whether the record is associated with a software application command; and in response to determining that the record is associated with a software application command, activating the software application command.

In a further aspect thereof an exemplary embodiment of this invention provides an apparatus to provide an additional interface for launching applications. The apparatus includes means for receiving information indicative of a record stored in an electronic device application; means for determining whether the record is associated with a software application command; and means for activating the software application command in response to determining that the record is associated with a software application command.

In an additional aspect thereof an exemplary embodiment of this invention provides a method to generate phonebook records for activating software application commands. The method includes receiving a selection of a user-selected software application command and a name for the software application. A phonebook record is generated using the name. The method also includes associating the phonebook record with the user-selected software application command. Storing the phonebook record in a phonebook is also included in the method.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention allow users to create their own services from a list of available services, for example, through use of a visual tool or user interface (UI). The user can provide their own name for the service using words familiar to them and uploads these to the device framework. The device framework assigns a unique identifier (ID) to this service and adds this to the user phonebook. The phonebook tags this as an application name which is different from personal contacts. The phonebook can then upload this to the car interface and user can invoke the service by saying the application name.

Figure 1:
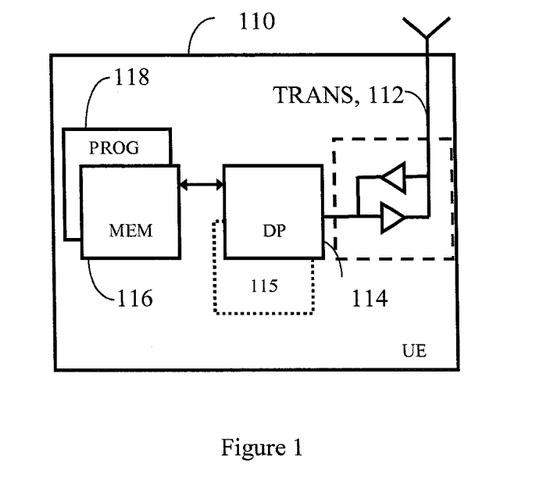
FIG. 1 shows a simplified block diagram of an exemplary electronic device that is suitable for use in practicing various exemplary embodiments of this invention.

Before describing in further detail various exemplary embodiments of this invention, reference is made to FIG. 1 for illustrating a simplified block diagram of an electronic device that is suitable for use in practicing exemplary embodiments of this invention.

The user equipment (UE) 110 includes a controller, such as a computer or a data processor (DP) 114, a computer-readable memory medium embodied as a memory (MEM) 116 that stores a program of computer instructions (PROG) 118, and a suitable wireless interface, such as radio frequency (RF) transceiver 112, for bidirectional wireless communications.

The PROGs 118 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 114 of the UE 110, or by hardware, or by a combination of software and hardware (and firmware).

The UE 110 may also include dedicated processors, for example, speech recognition device 115.

In general, the various embodiments of the UE 110 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEM 116 may be of any type suitable to the local technical environment and may be implemented using any suitable data storage technology, such as semiconductor based memory devices, flash memory, magnetic memory devices and systems, optical memory devices and systems, fixed memory and removable memory. The DP 114 may be of any type suitable to the local technical environment, and may include one or more of general purpose computers, special purpose computers, microprocessors, digital signal processors (DSPs) and processors based on a multicore processor architecture, as non-limiting examples. The wireless interface (e.g., RF transceiver 112) may be of any type suitable to the local technical environment and may be implemented using any suitable communication technology such as individual transmitters, receivers, transceivers or a combination of such components.

Figure 2:
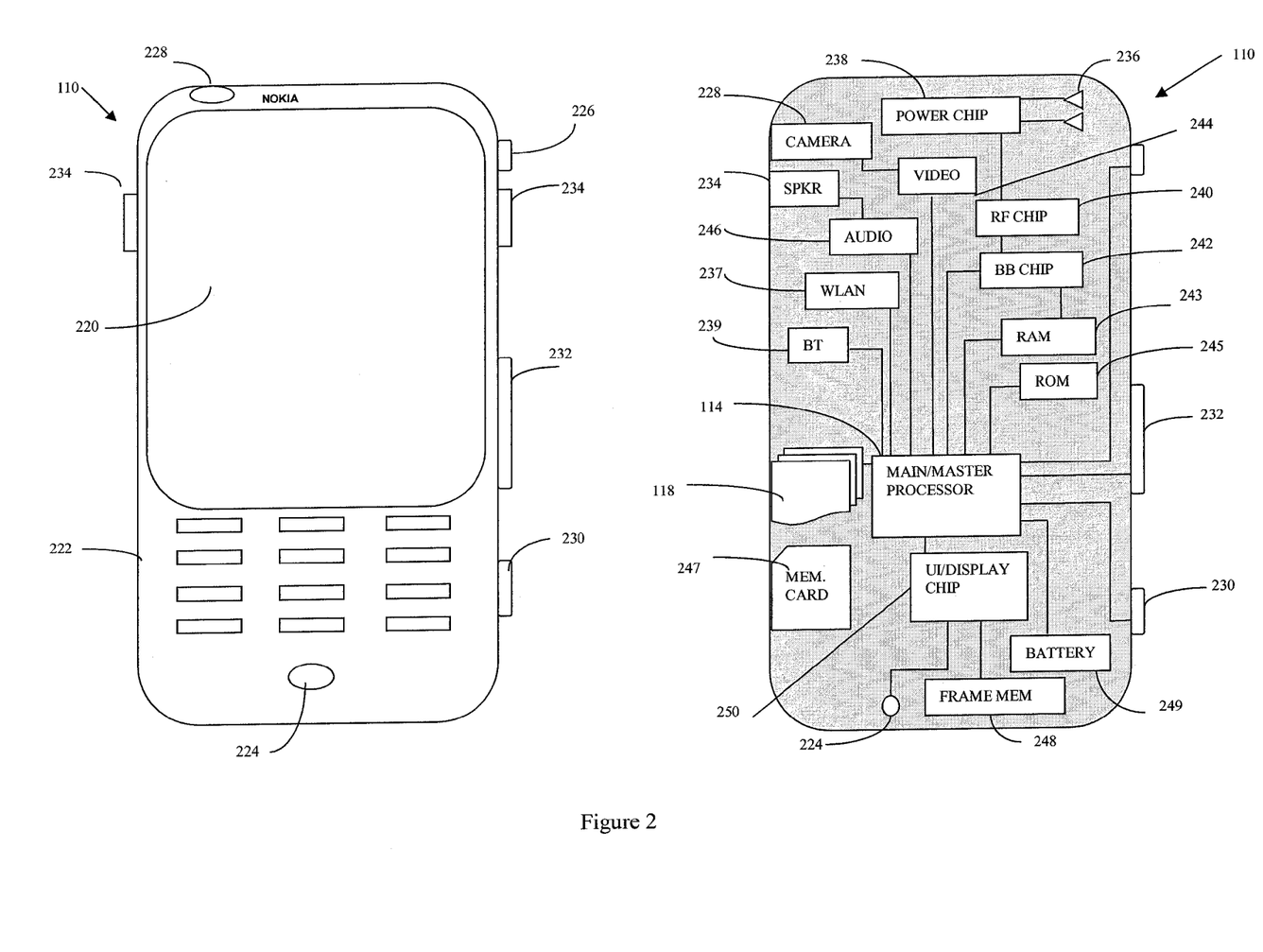
FIG. 2 shows a more particularized block diagram of an exemplary mobile device (for example, an user equipment) such as that shown at FIG. 1.

FIG. 2 illustrates further detail of an exemplary UE in both plan view (left) and sectional view (right), and the invention may be embodied in one or some combination of those more function-specific components. At FIG. 2 the UE 110 has a graphical display interface 220 and a user interface 222 illustrated as a keypad but understood as also encompassing touch-screen technology at the graphical display interface 220 and speech-recognition technology received at the microphone 224. A power actuator 226 controls the device being turned on and off by the user. The exemplary UE 110 may have a camera 228 which is shown as being forward facing (e.g., for video calls) but may alternatively or additionally be rearward facing (e.g., for capturing images and video for local storage). The camera 228 is controlled by a shutter actuator 230 and optionally by a zoom actuator 232 which may alternatively function as a volume adjustment for the speaker(s) 234 when the camera 228 is not in an active mode.

Within the sectional view of FIG. 2 are seen multiple transmit/receive antennas 236 that are typically used for cellular communication. The antennas 236 may be multi-band for use with other radios in the UE. The operable ground plane for the antennas 236 is shown by shading as spanning the entire space enclosed by the UE housing though in some embodiments the ground plane may be limited to a smaller area, such as disposed on a printed wiring board on which the power chip 238 is formed. The power chip 238 controls power amplification on the channels being transmitted and/or across the antennas that transmit simultaneously where spatial diversity is used, and amplifies the received signals. The power chip 238 outputs the amplified received signal to the radio-frequency (RF) chip 240 which demodulates and downconverts the signal for baseband processing. The baseband (BB) chip 242 detects the signal which is then converted to a bit-stream and finally decoded. Similar processing occurs in reverse for signals generated in the apparatus 110 and transmitted from it.

Signals to and from the camera 228 pass through an image/video processor 244 which encodes and decodes the various image frames. A separate audio processor 246 may also be present controlling signals to and from the speakers 234 and the microphone 224. The graphical display interface 220 is refreshed from a frame memory 248 as controlled by a user interface chip 250 which may process signals to and from the display interface 220 and/or additionally process user inputs from the keypad 222 and elsewhere.

Certain embodiments of the UE 110 may also include one or more secondary radios such as a wireless local area network radio WLAN 237 and a Bluetooth® radio 239, which may incorporate an antenna on-chip or be coupled to an off-chip antenna. Throughout the apparatus are various memories such as random access memory RAM 243, read only memory ROM 245, and in some embodiments removable memory such as the illustrated memory card 247. The various programs 118 are stored in one or more of these memories. All of these components within the UE 110 are normally powered by a portable power supply such as a battery 249.

Processors 238, 240, 242, 244, 246, 250, if embodied as separate entities in a UE 110, may operate in a slave relationship to the main processor 114, which may then be in a master relationship to them. Embodiments of this invention are most relevant to the internal speech recognition device 115 and external speech recognition devices (for example, a speech recognition device embodied in a car-dialer), though it is noted that other embodiments need not be disposed there but may be disposed across various chips and memories as shown or disposed within another processor that combines some of the functions described above for FIG. 2. Any or all of these various processors of FIG. 2 access one or more of the various memories, which may be on-chip with the processor or separate therefrom.

Note that the various chips (e.g., 238, 240, 242, etc.) that were described above may be combined into a fewer number than described and, in a most compact case, may all be embodied physically within a single chip.

Various exemplary embodiments in accordance with this invention allow users to invoke user-defined application/commands using a phonebook interface, for example, with a paired speech recognition device. In a non-limiting example, the user may activate the speech recognition device and speaks a command. This command is used to identify a phonebook tag which is associated with an application (such tags are different from personal contacts). The speech recognition device provides this information to the mobile device (e.g., via a Bluetooth interface) which can then perform the command (e.g., activate the application).

In additional embodiments, some or all actions may be performed by the mobile device, for example, where the mobile device includes speech recognition software/components or where the speech recognition device simply transmits the audio signal to the mobile device.

Some examples of operations of exemplary embodiments are given below:

A driver may wish to record their kids in the back when they start singing a song. The driver can open the dialer in the car and say "voice recorder". A voice recorder on the phone will start to record audio. The drive can then open the dialer and say a second command (e.g., "stop recorder") and the recorder will stop.

When the driver reaches a destination, they can then open the dialer and say "take me home" after which it will start a map application on the device and navigate to their home.

If the driver receives a text message they can open the car dialer and say "read SMS". The mobile device may then auto-read the text message. The driver can then open car dialer and say "reply voice". The device can then open a speech recognizer, converts audio to text and sends that text to a messaging application that would send it as a text reply.

In various non-limiting examples in accordance with this invention, the phone book is stored in a name dialer in the phone and possibly either all of the contacts in the phone book or a part of the contacts in the phone book are stored in the name dialer application (for example, in a built-in car dialer or other electronic device). However, this does not require any changes to software in the name dialer (of a car, for example) making it possible to run multiple applications using existing phonebook. In some embodiments, the phonebook can make use of a small extension in order to submit an application ID (and parameters provided by the user) to the device platform instead of dialing. Similarly, any other programs can use this extension and contact the device platform providing the ID of the user created program name.

The user can also provide specific parameters to the service/application. These may be additional 'hot words' that are associated with the same ID as that of the service/application. The phonebook may be provided 'hot words' as well with the ID. The phonebook may opt to not display the 'hot words' (unless navigated into by the user) but can export those to the dialer system (in the car, for example). The user can use these words after the service name has been spoken and have the command understood. These words may be spoken at anytime that the program is running and before the session has been terminated, e.g., by using another keyword, an expiring timeline or other criterion.

In a non-limiting example, the name dialer is used to recognize what a user has said and send that to the phone book, for example, by providing the ID of a phonebook entry. Alternatively, the name dialer may provide an unaltered audio channel to the mobile device which in turn may process the audio data in order to determine what was said.

A UI tool may be provided on a personal computer and can be synchronized with the device to get updates of all applications installed on the device. The UI tool may also be updated from an OEM site for updates on applications and parameters. The user can also provide parameters for applications such as 'hot words' for the speech recognition application. Another example would be a reader application where the user can also say the name of a file in a default directory that would be read by the reader application.

Once the user has created their personalized service (which includes a "command name" for the name dialer, a set of applications or instructions to be performed/invoked when that command is executed (for example, via the phone book), a set of optional parameters or hot words for that command and the unique ID for that "command name"/personalized service) this personalized service may be uploaded to their mobile device. The device platform then updates the service to the phonebook (and other registered applications). In one embodiment, the user can specify which applications to update this information to through the UI.

Figure 3:
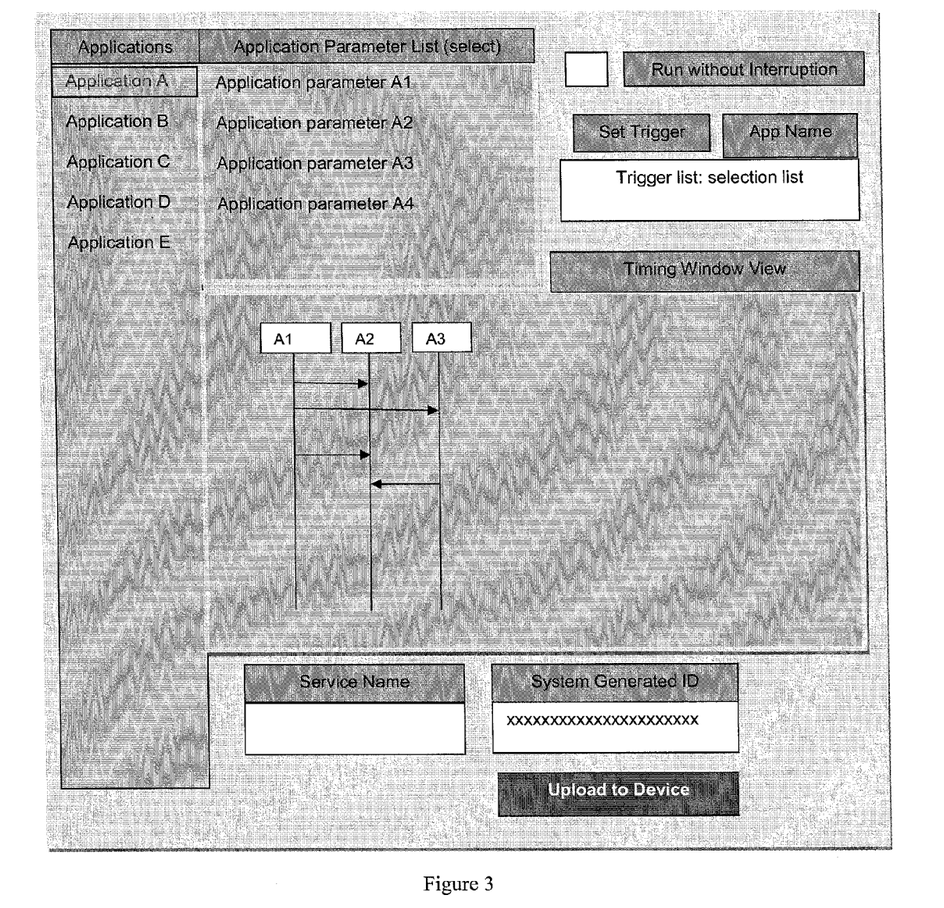
FIG. 3 shows a sample user interface (UI) that that is suitable for use in practicing various exemplary embodiments of this invention.

FIG. 3 shows a sample user interface (UI) that that is suitable for use in practicing various exemplary embodiments of this invention. Using the UI, users can create their own personalized service. Some applications may use additional parameters to provide data, while others can be invoked through triggers provided by other applications.

The user may also provide a timeline in which to invoke the various applications. In a non-limiting embodiment, the timeline may include a sequence in which to invoke the command, for example, invoking a second command using parameters generated by the invocation of a first command. In another non-limiting embodiment, the timeline can also specify when one application ends and another can begin or be executed in parallel. Using the timeline does not limit the application invocations.

The non-limiting UI includes various windows for providing a list of applications and application parameters. The application parameter list may be based on a selected application in the list of applications. As shown, 'Application A' is selected and possible parameters for A are shown. Operation of multiple applications (or multiple invocations of the same application) may be assigned triggers. Additionally, the UI may provide a timing window in order to show which applications are assigned to the service and the order in which they are invoked and/or interact.

The user may assign a name to the service and upload the service to a device. Alternatively, the new service may be saved into a memory on the device with the UI (e.g., where a mobile phone is used to define the service).

Even though a system generated ID is shown in the UI, this does not have to be displayed on the UI. It can be directly generated by the device platform when the service is uploaded to device.

Figure 4:
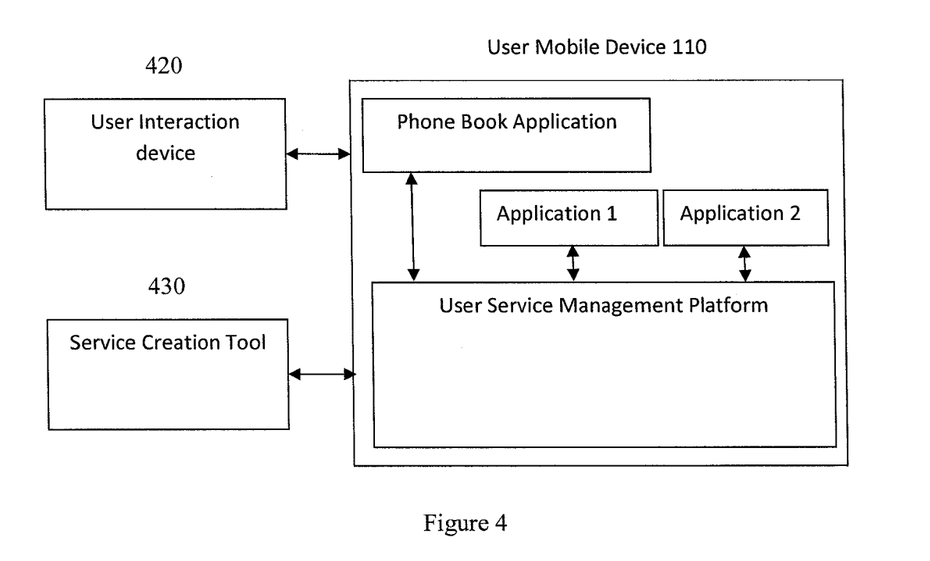
FIG. 4 shows a block diagram of an exemplary system that is suitable for use in practicing various exemplary embodiments of this invention

FIG. 4 shows a block diagram of a non-limiting exemplary system that is suitable for use in practicing various exemplary embodiments of this invention. UE 110 includes a phonebook application which communicates with the user service management platform. The user service management platform also communicates with Application 1 and Application 2. The UE 110 may be connected to the user interaction device 420, for example, a built-in car system or the name dialer application on the device. When using a separate device to perform remote name dialing, the connection between the mobile device and the separate device may be a Bluetooth connection, a WiFi connection, a physical connection or any other suitable interface technology. The UE 110 may also be connected to the service creation tool 430 which may be run on a separate device such as personal computer or web-based server.

As shown, user interaction device 420 and service creation tool 430 are shown separate from the UE 210; however, either or both of these may be embodied within the UE 110. For example, UE 110 may provide a platform to run the service creation tool 430 and/or provide user interaction via an installed microphone and speech recognition software.

Various exemplary embodiments in accordance with this invention provide numerous applications. Many applications may be controlled through an interface such as car dialer. The user can define unique ways to invoke and use the applications without requiring modification to current aspects of the in-car interaction. Multiple application mashups allows personalized and user-preferred naming for personal applications. There is no need to provide service calls for all available applications as the user may create service calls for applications they want and define how they want to invoke the application.

Since the user defines how they want to invoke the applications, the system is easier for each user to remember and more intuitive when using. Similarly, the user can define how to pass on parameters (not just command invocation) that makes sense to the user.

Using the UI the user can define additional parameters to pass to the applications in a context aware process. For example, the interface may be configured to provide location based information whenever a mapping application is invoked.

Based on the foregoing it should be apparent that the exemplary embodiments of this invention provide a method, apparatus and computer program(s) to provide an additional interface for launching applications.

Figure 5:
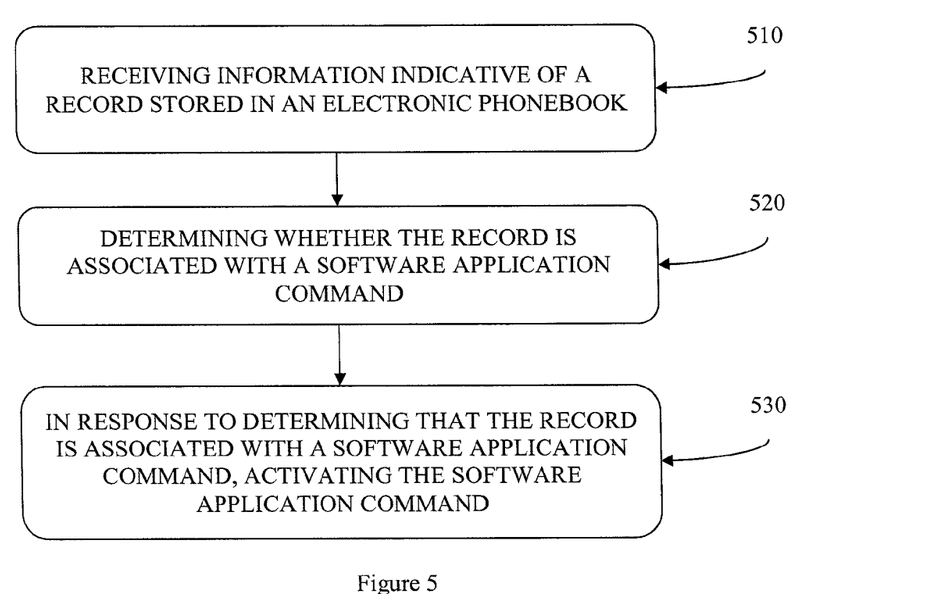
FIG. 5 is a logic flow diagram that illustrates the operation of an exemplary method, and a result of execution of computer program instructions embodied on a computer readable memory, in accordance with various exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 510, a step of receiving information indicative of a record stored in an electronic phonebook. At Block 520, a step of determining whether the record is associated with a software application command is performed. The method also includes, in response to determining that the record is associated with a software application command, activating the software application command in Block 530.

Figure 6:
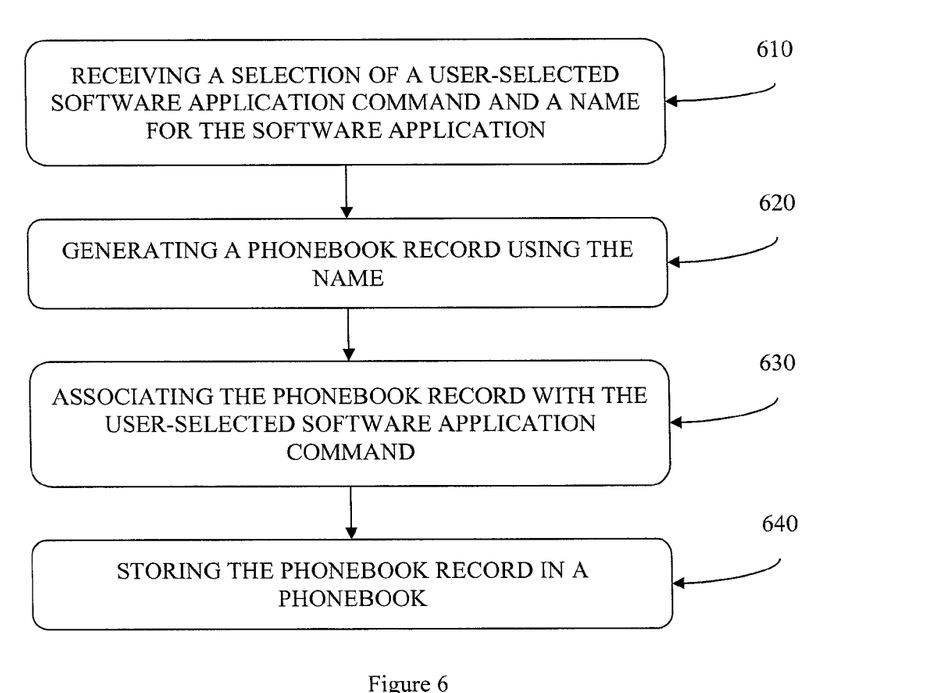
FIG. 6 is another logic flow diagram that illustrates the operation of an exemplary method, and a result of execution of computer program instructions embodied on a computer readable memory, in accordance with various exemplary embodiments of this invention.

FIG. 6 is another logic flow diagram that illustrates the operation of a method, and a result of execution of computer program instructions, in accordance with the exemplary embodiments of this invention. In accordance with these exemplary embodiments a method performs, at Block 610, a step of receiving a selection of a user-selected software application command and a name for the software application. A phonebook record is generated using the name at Block 620. At Block 630, a step of associating the phonebook record with the user-selected software application command is performed. The phonebook record is stored in a phonebook at Block 640.

The various blocks shown in FIGS. 5 and 6 may be viewed as method steps, and/or as operations that result from operation of computer program code, and/or as a plurality of coupled logic circuit elements constructed to carry out the associated function(s).

An exemplary embodiment in accordance with this invention is a method to provide an additional interface for launching applications. The method includes receiving information (e.g., at a processor) indicative of a record stored in an electronic device application. The method also includes determining (e.g., by a processor) whether the record is associated with a software application command. In response to determining that the record is associated with a software application command, the software application command is activated (e.g., at a processor).

In a further exemplary embodiment of the method above, the information includes additional parameters. Activating the software application command includes activating the software application command using the additional parameters.

In an additional exemplary embodiment of any one of the methods above, the information is received from a speech recognition component.

In a further exemplary embodiment of any one of the methods above, the software application command is launching a map application, starting a voice recorder or stopping a voice recorder.

In an additional exemplary embodiment of any one of the methods above, the electronic device application is a phonebook and the method also includes receiving a selection of a user-selected software application command and a name for the software application; generating a phonebook record using the name; associating the phonebook record with the user-selected software application command; and storing the phonebook record in the phonebook.

In a further exemplary embodiment of any one of the methods above, the method also includes receiving a selection of at least one application parameter; and associating the at least one application parameter with the phonebook record.

In an additional exemplary embodiment of any one of the methods above, the method also includes assigning an identifier to the phonebook record.

In a further exemplary embodiment of any one of the methods above, the method also includes exporting at least a portion of the phonebook record to a speech recognition component.

In an additional exemplary embodiment of any one of the methods above, the method also includes receiving at least one additional software application command and a timing sequence in which to activate a plurality of software application commands which include the user-selected software application command and the at least one additional software application command.

A further exemplary embodiment in accordance with this invention is an apparatus to provide an additional interface for launching applications. The apparatus includes at least one processor; and at least one memory including computer program code. The at least one memory and the computer program code are configured to, with the at least one processor, cause the apparatus to perform actions. The actions include to receive information indicative of a record stored in an electronic device application; to determine whether the record is associated with a software application command; and in response to determining that the record is associated with a software application command, to activate the software application command.

In an additional exemplary embodiment of the apparatus above, the information includes additional parameters. Activating the software application command includes activating the software application command using the additional parameters.

In a further exemplary embodiment of any one of the apparatus above, the information is received from a speech recognition component.

In an additional exemplary embodiment of any one of the apparatus above, the software application command is launching a map application, starting a voice recorder or stopping a voice recorder.

In a further exemplary embodiment of any one of the apparatus above, the electronic device application is a phonebook and the actions also include to receive a selection of a user-selected software application command and a name for the software application; to generate a phonebook record using the name; to associate the phonebook record with the user-selected software application command; and to store the phonebook record in the phonebook.

In an additional exemplary embodiment of any one of the apparatus above, the actions also include to receive a selection of at least one application parameter; and associating the at least one application parameter with the phonebook record.

In a further exemplary embodiment of any one of the apparatus above, the actions also include to assign an identifier to the phonebook record.

In an additional exemplary embodiment of any one of the apparatus above, the actions also include to export at least a portion of the phonebook record to a speech recognition component.

In a further exemplary embodiment of any one of the apparatus above, the actions also include to receive at least one additional software application command and a timing sequence in which to activate a plurality of software application commands which include the user-selected software application command and the at least one additional software application command.

An additional exemplary embodiment in accordance with this invention is a computer readable medium to provide an additional interface for launching applications. The computer readable medium is tangibly encoded with a computer program executable by a processor to perform actions. The actions include receiving information indicative of a record stored in an electronic device application; determining whether the record is associated with a software application command; and in response to determining that the record is associated with a software application command, activating the software application command.

In a further exemplary embodiment of the computer readable medium above, the information includes additional parameters. Activating the software application command includes activating the software application command using the additional parameters.

In an additional exemplary embodiment of any one of the computer readable media above, the information is received from a speech recognition component.

In a further exemplary embodiment of any one of the computer readable media above, the software application command is launching a map application, starting a voice recorder or stopping a voice recorder.

In an additional exemplary embodiment of any one of the computer readable media above, the electronic device application is a phonebook and the actions also include receiving a selection of a user-selected software application command and a name for the software application; generating a phonebook record using the name; associating the phonebook record with the user-selected software application command; and storing the phonebook record in the phonebook.

In a further exemplary embodiment of any one of the computer readable media above, the actions also include receiving a selection of at least one application parameter; and associating the at least one application parameter with the phonebook record.

In an additional exemplary embodiment of any one of the computer readable media above, the actions also include assigning an identifier to the phonebook record.

In a further exemplary embodiment of any one of the computer readable media above, the actions also include exporting at least a portion of the phonebook record to a speech recognition component.

In an additional exemplary embodiment of any one of the computer readable media above, the actions also include receiving at least one additional software application command and a timing sequence in which to activate a plurality of software application commands which include the user-selected software application command and the at least one additional software application command.

In a further exemplary embodiment of any one of the computer readable media above, the computer readable medium is a non-transitory computer readable medium (for example, a CD-ROM, RAM, flash memory, etc.).

An additional exemplary embodiment in accordance with this invention is an apparatus to provide an additional interface for launching applications. The apparatus includes means for receiving (e.g., a processor) information indicative of a record stored in an electronic device application; means for determining (e.g., a processor) whether the record is associated with a software application command; and means for activating (e.g., a processor) the software application command in response to determining that the record is associated with a software application command.

In a further exemplary embodiment of the apparatus above, the information includes additional parameters. The activating means includes means for activating the software application command using the additional parameters.

In an additional exemplary embodiment of any one of the apparatus above, the information is received from a speech recognition component.

In a further exemplary embodiment of any one of the apparatus above, the software application command is launching a map application, starting a voice recorder or stopping a voice recorder.

In an additional exemplary embodiment of any one of the apparatus above, the electronic device application is a phonebook and the apparatus also includes means for receiving a selection of a user-selected software application command and a name for the software application; means for generating a phonebook record using the name; means for associating the phonebook record with the user-selected software application command; and means for storing the phonebook record in the phonebook.

In a further exemplary embodiment of any one of the apparatus above, the apparatus also includes means for receiving a selection of at least one application parameter; and means for associating the at least one application parameter with the phonebook record.

In an additional exemplary embodiment of any one of the apparatus above, the apparatus also includes means for assigning an identifier to the phonebook record.

In a further exemplary embodiment of any one of the apparatus above, the apparatus also includes means for exporting at least a portion of the phonebook record to a speech recognition component.

In an additional exemplary embodiment of any one of the apparatus above, the apparatus also includes means for receiving at least one additional software application command and a timing sequence in which to activate a plurality of software application commands which include the user-selected software application command and the at least one additional software application command.

A further exemplary embodiment in accordance with this invention is a method to provide an additional interface for launching applications. The method includes receiving a selection of a user-selected software application command and a name for the software application. A phonebook record is generated using the name. The method also includes associating the phonebook record with the user-selected software application command. Storing the phonebook record in a phonebook is also included in the method.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, by a mobile device, via a user interface of the mobile device information indicative of a phonebook record stored in the mobile device, where the information comprises a user-selected software application command and at least one application parameter specific to the user-selected software application command;
   determining, by the mobile device, that the user-selected software application command is associated with a phonebook record assigned to a software application command of the mobile device; and
   in response to determining that the user-selected software application command is associated with the phonebook record assigned to the software application command, activating with the phonebook record the software application command, where activating the software application command comprises activating the software application command using the at least one application parameter specific to the user-selected software application command.

2. The method of claim 1, where the information is received via the user interface using a speech recognition component of the mobile device.

3. The method of claim 1, where the software application command is one of: launching a map application, starting a voice recorder and stopping a voice recorder.

4. The method of claim 1, where assigning the phonebook record to the software application command comprises:
   displaying, via the user interface, a list of software applications;
   receiving, via the user interface, a user-selected software application of the list and a name for the user-selected software application, where the name comprises the user-selected software application command;
   generating a phonebook record using the name;
   associating the phonebook record with the user-selected software application; and
   storing the phonebook record in a phonebook application of mobile device.

5. The method of claim 4, further comprising receiving, via the user interface, a selection of at least one application parameter; and associating the at least one application parameter with the phonebook record.

6. The method of claim 4, further comprising assigning an identifier to the phonebook record, where the user-defined software application command is used by the mobile device to determine the identifier assigned to the phonebook record which is assigned to the software application.

7. The method of claim 2, further comprising exporting at least a portion of the phonebook record to the speech recognition component.

8. The method of claim 4, further comprising receiving, via the user interface, at least one additional user-selected software application command and using a timing sequence in which to activate in a predetermined order a plurality of software application commands comprising the user-selected software application command and the at least one additional user-selected software application command.

9. An apparatus, comprising:
   at least one processor; and
   at least one memory including computer program code, the at least one memory and the computer program code configured to, with the at least one processor, cause the apparatus to perform at least to:
   receive, with a user interface of a mobile device, information indicative of a phonebook record stored in the mobile device, where the information comprises a user-selected software application command and at least one application parameter specific to the user-selected software application command;

determine that the user-selected software application command is associated with a phonebook record assigned to a software application command of the mobile device; and in response to determining that the user-selected software application command is associated with the phonebook record assigned to the software application command, activate with the phonebook record the software application command, where activating the software application command comprises activating the software application command using the at least one application parameter specific to the user-selected software application command.

10. The apparatus of claim 9, where the at least one memory and the computer program code are further configured with the at least one processor to cause the apparatus to:

display, via the user interface, a list of software applications and application specific parameters of the apparatus;

receive, via the user interface, a user-selected software application command of the list and a name for the software application, where the name comprises the user-selected software application command;

generate a phonebook record using the name;

associate the phonebook record with the user-defined software application; and store the phonebook record in the a phonebook application of the apparatus.

11. The apparatus of claim 10, where the at least one memory and the computer program code are further configured to cause the apparatus to export at least a portion of the phonebook record to a speech recognition component.

12. A non-transitory computer readable medium tangibly encoded with a computer program executable by a processor to perform actions comprising:

receiving, via a user interface of a mobile device, information indicative of a phonebook record stored in the mobile device, where the information comprises a user-selected software application command and at least one application parameter specific to the user-selected software application command;

determining that the user-selected software application command is associated with a phone book record assigned to a software application command of the mobile device; and in response to determining that the user-selected software application command is associated with the phone book record assigned to the software application command, activating with the phonebook record the software application command, where activating the software application command comprises activating the software application using the at least one application parameter specific to the user-selected software application command.

13. The computer readable medium of claim 12, where assigning the phonebook record to the software application command comprises:

displaying, via the user interface, a list of software applications receiving, via the user interface, a user-selected software application of the list and a name for the user-selected software application, where the name comprises the user-selected software application command;

generating a phonebook record using the name;

associating the phonebook record with the user-selected software application; and storing the phonebook record in a phonebook application of the mobile device.

14. The computer readable medium of claim 13, further comprising exporting at least a portion of the phonebook record to a speech recognition component.

15. An apparatus comprising:

means for receiving, via a user interface of a mobile device, information indicative of a phonebook record stored in the mobile device, where the information comprises a user-selected software application command and at least one application parameter specific to the user-selected software application command;

means for determining that the user-selected software application command is associated with a phonebook record assigned to a software application command; and means for activating with the phonebook record the software application command in response to determining that the user-selected software application command is associated with the phonebook record assigned to the software application command, where activating the software application command comprises activating the software application command using the at least one application parameter specific to the user-selected software application command.

16. The apparatus of claim 15, where assigning the phonebook record to the software application command comprises:

means for display, via the user interface, a list of software applications and application specific parameters of the apparatus;

means for receiving, via the user interface, a user-selected software application of the list and a name for the user-selected software application;

means for generating a phonebook record using the name;

means for associating the phonebook record with the user-selected software application; and means for storing the phonebook record in a phonebook of the apparatus.

17. The apparatus of claim 16, further comprising means for exporting at least a portion of the phonebook record to a speech recognition component.

18. The method of claim 1, where the information is received wirelessly by the mobile device.

19. The method of claim 1, where the information is received wirelessly from an external device paired with the mobile device.

* * * * *